United States Patent [19]

Dreher et al.

[11] Patent Number: 4,866,622
[45] Date of Patent: Sep. 12, 1989

[54] DRIVE SYSTEM FOR MOTOR VEHICLES

[75] Inventors: Gunther Dreher, Munich; Peter von Korff, Buch am Ammersee, both of Fed. Rep. of Germany

[73] Assignee: MAN Technologie GmbH, Munich, Fed. Rep. of Germany

[21] Appl. No.: 875,490

[22] Filed: Jun. 18, 1986

[30] Foreign Application Priority Data

Jul. 25, 1985 [DE] Fed. Rep. of Germany ....... 3526671

[51] Int. Cl.$^4$ ................. B60K 41/08; G05D 13/58
[52] U.S. Cl. .................. 364/431.04; 180/306; 364/424.1; 364/431.01
[58] Field of Search ............... 364/424.1, 431.01, 442, 364/431.04, 431.05; 74/866; 180/306

[56] References Cited

U.S. PATENT DOCUMENTS

| | | | |
|---|---|---|---|
| 4,262,335 | 4/1981 | Ahlen et al. | 364/424.1 |
| 4,463,427 | 7/1984 | Bonnetain et al. | 364/442 |
| 4,471,437 | 9/1984 | Yoshino et al. | 364/424.1 |
| 4,506,752 | 3/1985 | Hara et al. | 74/866 X |
| 4,541,052 | 9/1985 | McCulloch | 364/424.1 |
| 4,542,802 | 9/1985 | Garvey et al. | 180/306 |
| 4,564,906 | 1/1986 | Stephan et al. | 364/424.1 |
| 4,648,290 | 3/1987 | Dunkley et al. | 364/424.1 |

OTHER PUBLICATIONS

Mohl et al: Elektronische Getriehesteuerung, Bosch Techn. Berichte 7 (1983).
Ono et al: Microprocessor Controls Engine and Transmission, 1983 Society of Automotive Engineers.

*Primary Examiner*—Felix D. Gruber
*Attorney, Agent, or Firm*—Alan H. Levine

[57] ABSTRACT

A drive system for a motor vehicle comprising a power train made up of an IC engine with an associated transmission and a brake system, operating elements for control of the power train and control devices for modifying the function of the power train to take into account operational data and characteristic curves of the operating elements, such operating elements being designed to generate output control signals and transmit them to the control devices. The control devices comprise an electronic engine electronic control means, a transmission electronic control means for self-contained automatic control of the engine and the transmission respectively, and a supervising computer which is adapted to coordinate the functions of the engine and transmission electronic control means for optimizing operation of the power train by coordinating the functions of the electronic systems for the engine and the transmission. At least a part of the signals from the operating elements are supplied directly to the supervising computer.

9 Claims, 3 Drawing Sheets

DRIVE SYSTEM FOR MOTOR VEHICLES

BACKGROUND OF THE INVENTION

The invention relates to a driving system for motor vehicles comprising a power train made up of an IC engine with associated transmission and brake means, of operating elements for control of the power train and of control devices for modifying the function of the power train to take into account operational data and characteristic curves of the operating elements, such operating elements being designed to generate output control signals and transmit them to the control devices.

In such electronically controlled motor vehicles the settings of the accelerator pedal and the gear shift or lever are not transmitted in the normal way directly but by way of suitable electronic regulators, forming part of the control devices, to the power train. Such electronic instrumentalities make it possible to modify the action of the operating elements on the controlled members (i. e. of the accelerator pedal on the carburetor and of the gear shift on the gear box) to a certain degree so that within certain limits there is a departure from the straightforward proportionality between the respective settings of, for example, the accelerator pedal and the effect produced thereby on the carburetor. Accordingly the control of the power train, as for example the supply of fuel to the engine, may be so affected that the operation of the engine is changed to ensure an enhanced efficiency.

SHORT SUMMARY OF THE PRESENT INVENTION

One object of the present invention is to create a different concept of driving system of the initially specified type.

A further air of the invention is to design such a novel system that is simple to manufacture.

A still further object of the invention is to create a driving system which is adaptable as regards the manner of automatic control or regulation.

Another aim of the invention is to provide such a system that may be enlarged upon or expanded.

In order to achieve these or other objects that may appear in the ensuing specification and claims, the system of the invention is characterized in that the control devices comprise an electronic engine control system, an electronic transmission control system for self-contained automatic control of the engine and the transmission respectively, and a supervising computer which coordinates the functions of the engine and transmission electronic control means for optimizing operating of the power train by coordinating the functions of the electronic systems for the engine and the transmission, and at least a part of the signals from the operating elements are supplied to the supervising computer.

In this system the provision of the supervising computer between the operating elements, such as the accelerator and brake pedals and the electronic controllers, makes possible a substantial enlargement of the limits of operational optimisation as compared with electronically controlled vehicles so far designed. The optimisation of the power train may therefore take place so as to simultaneously take account of the running costs, the efficiency and the effects on the environment insofar as the control devices and the supervising computer are suitably designed to ensure that the components are controlled in a coordinated manner.

The invention is based on the concept that the characteristics and/or the operation of a component of power train may be influenced or changed by another component and by external effects (weight, temperature, nature of the terrain etc.) and that if one takes these factors into account the optimisation of a power train may be further developed or enlarged upon. To take an example, it has so far not been possible to control the engine and the transmission in a way dependent on the operational condition of the power train and simultaneously external factors, such as the nature of the road (slope, applicable speed limit; also the amount of load, etc.).

The supervising computer furthermore makes it possible to so process the orders of the driver as transmitted via the operating elements that an adjustment of the respective controlled members does not take place so as to more or less directly comply with the operating elements, but in such a way that an economic and convenient operation of the power train and the vehicle is possible, accompanied by less wear on the vehicle and production of cleaner exhaust gases. For this reason a "wild" or illogical manner of operation by the driver (apart from the case of operation of the steering system) does not result in a "wild" operation of the vehicle: even if the driver continually keeps his foot "flat down" there will not be a correspondinly uneconomic operation of the vehicle.

Furthermore by suitably programming the supervising computer it is possible to provide for a speed governing function with suitable control of the engine and the transmission simultaneously. As a result it is possible to keep the vehicle to a given speed even when traveling uphill or downhill by causing an additional change in gear automatically at an appropriate time. The simultaneous, coordinated control of the engine and the transmission also makes it possible to so take into account a changed torque ratio in the transmission on changing gear that there is compensation of tractive force commensurate with engine torque changes. The coordinated control furthermore avoids unnecessary changing of the gears (i.e. changing up when the driver will have to change down again almost at once).

The utilisation of a self-contained engine electronic control system and of a transmission electronic control system (in the form of electronic regulators) ensure that the vehicles will still be operational even if the supervising computer should fail, on which they are only dependent to the extent that they merely receive set point from it. If no set point is provided by the supervising computer, they will then receive the operating element signal as a set point directly.

The electronic systems noted and the supervising computer are preferably in the form of separate units so that good adaptation to different driving systems is possible insofar as the separate units may be combined in accordance with the respective application. And it is not necessary to modify all the control devices and elements of the power train for each new configuration.

The supervising computer may consist mainly of a signal processing unit, input-output units, memory units and a microprocessor. The input signals to the supervising computer from the operating elements are prepared in the signal processing unit and then supplied to the input unit of the supervising computer.

In keeping with a further development of the invention at least a part of the processed signals is simultaneously supplied to the electronic systems (i. e. the electronic regulators).

In this manner it is possible to ensure that the input signals may further more act on other control devices directly if the supervising computer, and more especially its cpu, should fail.

In normal operation the supervising computer receives the signals corresponding to movement of the driver's foot pedals and feed back or actual value signals (setting of the member controlling the supply of fuel, setting of the transmission and the brake pressure), as well as further measured data such as the speed of the engine, the speed at the output of the transmission, the pump settings and the pressure of hydraulic system, data relating to the load, the engine temperature, exhaust data etc. and these globally as measured data termed signals are used in the supervising computer to produce necessary control signals. Furthermore in the supervising computer the characteristic curves of the respective engine and of the transmission and of the brake system are stored. Lastly, the computer is provided with a program, on the basis of which the measured data, the stored drive-specific data and an optimisation criterion are used to calculate set point signals for the electronic engine and transmission electronic control means.

These centrally computed set points may thus be evolved so as to match the overall drive line and the vehicle so that for the regulation of the supply of fuel to the IC engine, for example, it will not only be the engine-specific data and the driver's signals transmitted via the accelerator pedal but furthermore data from one component of the power train and relevant external factors such as the load, the slope of the road etc which will be taken into account. These data may then be employed for the coordinated control of all units of the power train so that it is possible to achieve an optimized control of the driving unit in view of the efficiency, reduction in wear, protection of the environment and driver convenience.

In keeping with a further development of the invention the supervising computer is so designed that it stores measured data for some time to be able to use them for determining the current mode of operation of the vehicle. On the basis of the previous travel mode of the vehicle, as for instance a substantially constant speed, corresponding to travel on a high-speed motorway, or travel with frequent stops, corresponding to travel in a city, it is possible, given a suitable program for the computer, to ascertain the instantaneous mode of travel and to take such mode into account in establishing the set points. Simply by software patches it is possible for the supervising computer and thus the entire group of control devices to be set for different vehicle applications, that is to say for a private car, a bus, a refuse or standard truck.

Sensors provided in the power train serve to detect the instantaneous state of the elements of the power train or of the vehicle. The feed back signals denoting the actual condition of the controlled members may with advantage be supplied to the corresponding electronic units, whence they are then passed on to the supervising computer. This gives the advantage that already existing units (the engine plus its electronic control means, the transmission plus its electronic control means), may be integrated without any undue alterations in the drive system of the invention. In this respect it is for example possible for the setting of the lever for adjusting the fuel injection rate to be communicated to the engine electronic control means as a feed back signal for the fuel injection rate. In the engine electronic control means the feed back signal is compared with the set point supplied by the supervising computer and used to evolve the control signal acting on the respective controlled member.

However, it is also possible to supply such feed back or actual values to the supervising computer and to supply them via the computer as a processed signal to the electronic control means, if for instance supervising computer in a single assembly.

The drive system of the invention is capable of being further developed if one or more additional electronic units are controlled via the supervising computer, such units including for instance an electronic unit for the regulation of an energy storage means or of the brake system. In this manner it is also possible for these functions to be controlled with coordination with the other ones. In the case of the brake system it is expedient if the brake pedal cooperates mechanically and/or hydraulically with the brakes and at the same time produces a signal for the supervising computer, which in cooperation with the brake electronic means affects the braking operation in order to have a favorable effect thereon, as for example to prevent skidding. In such a brake system it is possible to optimize the braking operation while still being certain of a safe and reliable operation of the brakes.

The invention will now be described in more detail on the basis of working examples thereof that are shown in the diagrammatic drawings.

LIST OF THE SEVERAL FIGURES OF THE DRAWINGS.

DETAILED ACCOUNT OF WORKING EMBODIMENTS OF THE INVENTION

Figure 1:
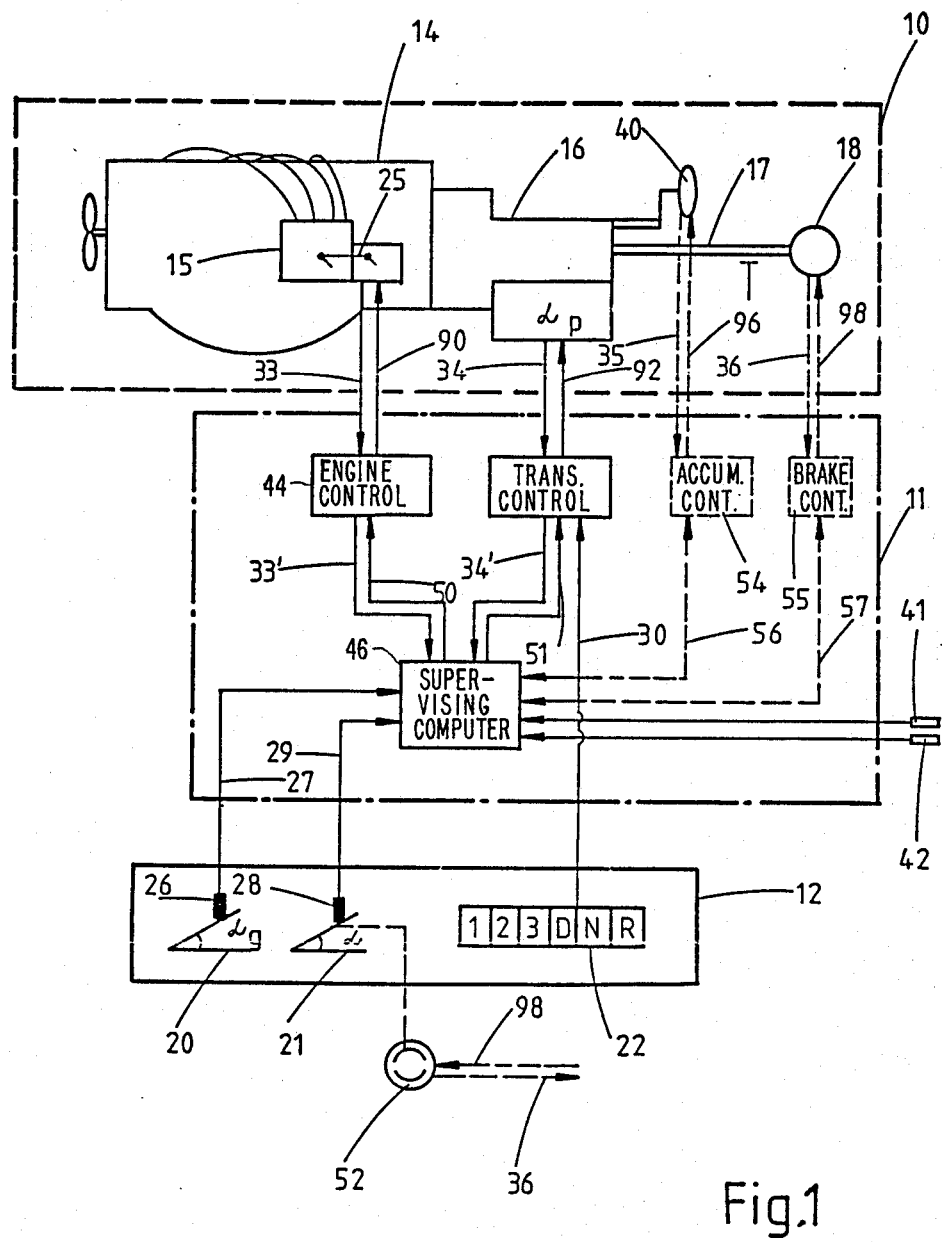
FIG. 1 shows a drive line with the control devices and the operating elements.

The drive system illustrated in FIG. 1 consists of a power train 10, control devices which are associated with one of the components of the power train and are together in the enclosure 11 marked in broken lines, and operating elements 12, that act on the control devices. An IC engine 14 with its fuel supply system 15, a transmission 16 with its drive shaft 17 and the drive axle 18, a brake energy accumulator 40 and the brake system 52 form the power train 10.

For controlling power train 10 the driver conventionally uses a accelerator pedal 20, a brake pedal 21 and a gear shift 22 or gear shift lever. The pedal displacement that is to say the angle $\alpha_g$ and $\alpha_b$ is detected by a displacement sensor 26 and 28, respectively, producing a signal 27 and 29, respectively.

The gear shift 22 indicates the respectively desired mode of travel (forward motion D, reverse motion R, neutral N and motion on a level road (1), uphill motion (2) and motion downhill (3)) by way of corresponding signals 30. The signals 27, 29, and 30 represent the mode of operation or travel desired by the driver. Furthermore there are sensors, which are not shown, associated with the energy accumulator 40 and brake system 52, such sensors supplying feed back or actual value signals 33 through 36.

Further sensors 41 and 42 supply detected or vehicle data as for example the acceleration of the vehicle, the oil pressure, the engine temperature, the composition of the exhaust, the vehicle weight etc.

In their basic design control devices 11 consist of an electronic engine control means 44 for regulation of the supply of fuel to IC engine 14, a transmission electronic control means 45 for regulation of the ratio of transmission 16 and of supervising computer 46 controlling two control means 44 and 45. On the basis of measured data 27, 29, 41, 42, 33, 34 or 33' and 34', respectively, the computer derives set points 50 and 51 for engine electronic control means 44 and transmission electronic control means 45. In this connection accelerator pedal 20 acts exclusively on supervising computer 46, whereas brake pedal 21 actuates brakes 52 in a customary manner and at the same time supplies signal 29 to supervising computer 46.

The signals 30 from gear shift 22 are directly supplied to transmission electronic control means 45. However, it is also possible to supply this signal 30 and brake pedal signal 29 directly to supervising computer 46.

The system made up of control devices 11 may be readily enlarged by the addition of further electronic control means 54 and 55, which are also supplied with set point signals 56 and 57 from the supervising computer and used to control further units assigned to specific functions or elements of the power train 10. For instance, energy accumulator 40 may be controlled with the additional electronic control means 54 and the brake system may be controlled with second additional electronic control means 55.

Figure 2:
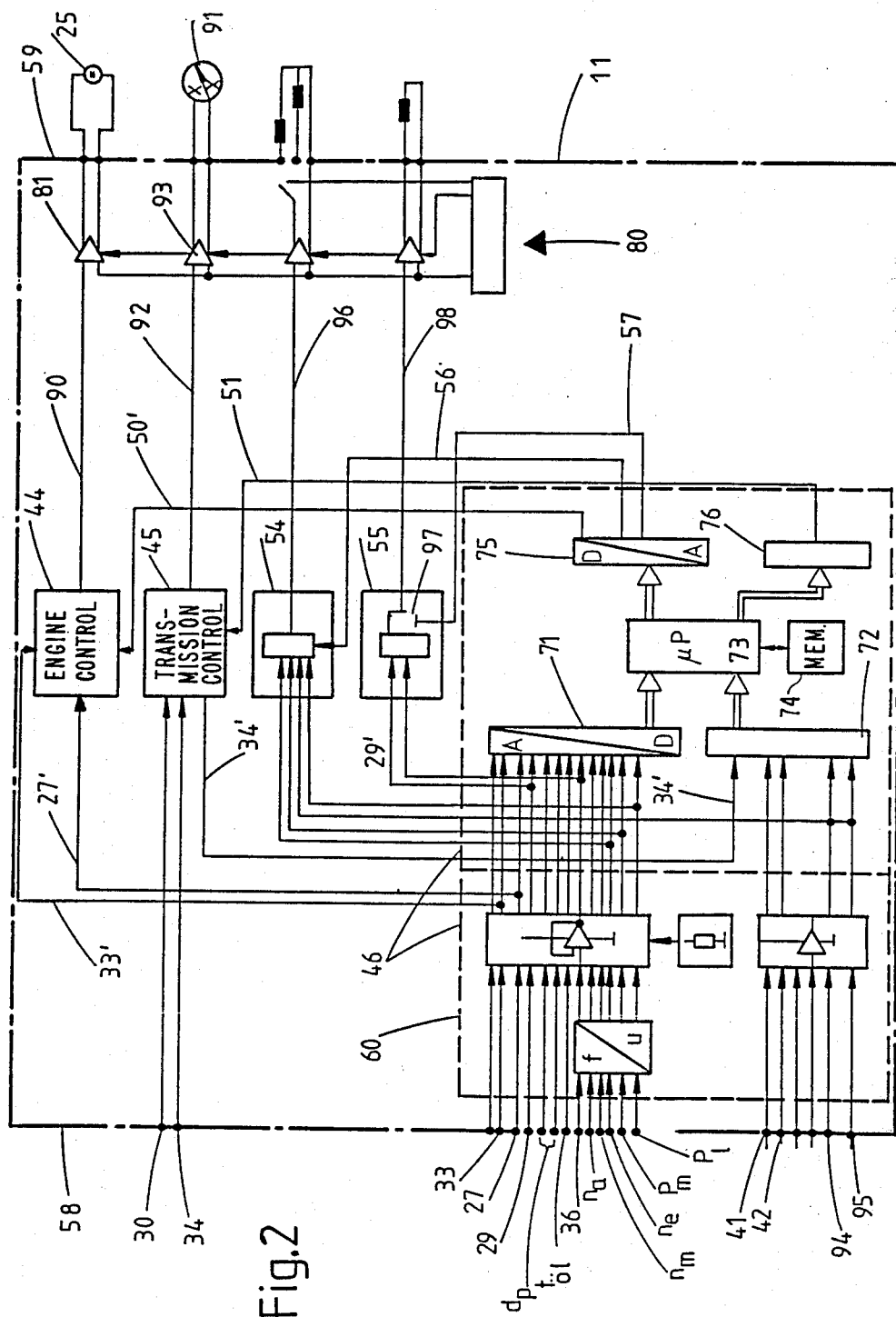
FIG. 2 shows a schematic of the control devices of FIG. 1.

FIG. 2 is a block schematic of control devices 11 grouped together in a single assembly. On the left there is an interface 58 for the input signals, that is to say the measured data signals and on the right side there is an interface 59 for the output signals, which are limited for the drive line.

It is obviously also possible for control devices 11 to take the form of separate groups of units, that is to say engine electronic control means 44, transmission electronic control means 45 and any other electronic control means 54, 55 and supervising computer 46 which would then be separately manufactured and connected with each other in the vehicle by signal leads.

The supervising computer 46 (FIG. 2) consists of a signal processor 60 for the measured data, a microprocessor 73, a memory 74 and input-output units 71, 72, 75 and 76. In the present embodiment additional electronic control means 54 and 55 and engine electronic control means 44, transmission electronic control means 45 and associated drive parts 80 for operation of the controlled members are integrated. In memory 74 the characteristics (functions of drive, torque and fuel consumption as dependent on the engine speed) of the particular engine, the characteristic for the optimum operation of the transmission and the families of characteristics of any drive operation components are stored. Furthermore, the measured data and output data of the supervising computer are stored for a certain length of time, i. e. for the time directly before the present.

The order of the driver with respect to the speed of travel is represented by the accelerator pedal setting $\alpha_g$ and accordingly by the respective signal 27 thereof. The output signal 27 of the displacement sensor 26 is processed in the signal processor 60 in accordance with a method familiar in the automatic control art and converted in an A/D converter 71 for input to the microprocessor 73.

The processed signal 27' is at the same time also directly supplied to the engine electronic control means 44 as set point whereas the microprocessor 73 uses this signal 27' the feed back value 33, with further measured data signals, that is to say the engine speed signal $n_m$, the engine oil temperature signal $t_{o1}$, the gear $\alpha_p$ which the transmission has been put into, the output speed $n_a$ of the transmission, the external temperature, exhaust data, any energy storage means data, as for instance the families of drive characteristics to derive a set point correction signal 50'. This set point correction signal 50' is used to modify the set point 27' produced by the setting of the accelerator pedal 20 in order to arrive at optimum operation not only of the IC engine 14 but also of the entire power train 10. The modified, that is to say optimized, set point for the angle of setting of the fuel supply controlled member 25 is compared in the engine electronic control means 44 with the detected and processed instantaneous feed back value 33', which stands for the intantaneous angle of setting of the fuel supply controlled member 25. Finally the controlled member 25 of the fuel supply system 15 is operated by the comparison signal, that is to say the control signal 90 of the fuel supply and via an amplifier 81 of the power electronic system 80.

In the embodiment in keeping with FIG. 2 the feed back signal 33 of the fuel supply system 15 is supplied directly to the supervising computer 46 (unlike the case of FIG. 1) and in the computer 46 the feed back signal 33 is processed with the signal processing circuitry which is in any case present in the signal processor 60 and the resulting signal may be fed to microprocessor 73 and the engine electronic control means 44 so that emergency operation is possible if the supervising computer fails.

If the input and out unit 71, 72, 75 and 76, the microprocessor 73 or the data memory 74 should fail, the correction signal 50' is no longer produced. In such a case there is then no correction of the set point value 27' provided which accordingly is compared without modification in the engine electronic control means 44 with the feed back signal 33' for producing the servo signal 90. The IC engine will therefore now be operated in a conventional manner.

The regulation of the IC engine may however also be undertaken in such a way that the set point correction is performed in the supervising computer 46 and engine electronic control means 44 is supplied with the optimized set point signal 50 as in the case of the embodiment of FIG. 1. Then if the supervising computer fails the uncorrected, pre-established set points 27 and 27' will be supplied.

For the transmission electronic control means 45 the supervising computer 46 derives a set point 51 on the basis of the instantaneous state 34 ($\alpha_p$) i,e. the actual or feed back value, of the hydrostat 91 (which for example is in the form of a hydrostatic transmission 16), the accelerator pedal signal 27, the families of characteristics of the IC engine 14 and of the transmission 16, the intantaneous ratio of the transmission, the engine speed $n_m$, the load of the vehicle, any energy storage means data, the setting of the gear shift 22, i.e. forwards, neutral, reverse, first etc. gear. The set point 51 represents the optimum gear or setting of the transmission 16. Acting on this set point 51 and the processed feed back or actual value 34' and taking into account the set mode of travel 30 the transmission electronic control means 45 puts the transmission into the corresponding gear.

Via the supervising computer 46 the information is in this way exchanged between the IC engine 14 and the transmission 16 so that on controlling one component the other component is taken into account. Furthermore other factors relevant for the operation of the vehicle (brakes, temperature, exhaust), the vehicle itself (load) or external factors (wind) may be taken into account in deriving optimized set point in order to include other factors in the optimisation process such as driver convenience and the effect on the environment The minimum configuration of the control devices 11 includes the components described so far, namely the supervising computer 46 the engine and transmission electronic control means 44 and 45, respectively, and the means for processing the engine and transmission data in deriving the respective set points.

There are not limits with respect to enlargement of the system to include further data inputs and electronic regulation means.

It is for example possible to connect an additional electronic control means 54 to operate an energy storage means or accumulator 40 to take into account the engine speed $n_m$, the pedal settings $\alpha_g$ and $\alpha_b$, the mode of travel signal 30, the drive output speed $n_a$, a subsidiary output speed $n_e$ and characteristics of the energy storage means 40.

An additional electronic control means would also be able to be employed for controlling the direction of tipping of the container of a refuse or other truck by detecting the respective pressure signals $p_m$ and $p_1$, respectively, of the hydraulic systems used. The pressure signals would be processed as control signals 56 or servo signals 94 taking into account signals 94 and 95.

In a brake electronic control means 55 there is a two way switch 97 with which the change in the brake pressure may be brought about either directly proportionally to the brake pedal signal 29 or by way of a set point 57 as derived by the supervising computer 46. The set point 57 as an output of the supervising computer 46 is derived so as to take into account the speed of travel, the gear which has been engaged, the feed back or actual value (brake pressure) 36' of the brake pedal effect $\alpha_b$ and external factors such as wind and rain. In the brake electronic control means 55 the servo or setting signal 98 for the brake system 52 is derived on the basis of the set point 57, and the feed back value 36' as well as the brake pedal signal 29'.

The regulating electronic control means 44, 45, 54 and 55 may designed on the lines of conventional control devices.

Accordingly the supervising computer 46 is so designed that it takes into account the manner of functioning of the respective regulating electronic control means.

The supervising computer 46 will as a rule be an assembly that is separate from the regulation electronic control means 44, 45, 54, and 55 and will have sufficient input and output terminals in order to be a general purpose device able to be adapted to all possible control schemes or configurations.

The optimisation of the operation of a vehicle, which exceeds the possibilities of the individual regulation electronic control means, is caused by a storage of data and functions and by writing a suitable computer program.

Prior art regulation electronic control means have provided for a certain degree of cooperation of coordination which had been previously effected in purely mechanically and/or hydraulically driven vehicles by the driver, but this could not be taken into account. In the case of heavy vehicles it is for instance appropriate to accelerate the engine when changing gear. This was not possible in the introduction of an engine electronic control means, since such means was not able to detect a change of gear.

On the other hand in the present invention all these and even additional forms of coordination are possible on controlling the individual elements of the power train.

The supervising computer 46 recognizes when a gear change is necessary. By running it on a suitable program the supervising computer 46 will be caused to produce a set point 50 or a set point correction 51, which causes the engine to be revved up on changing gear. However this part of the program will only be provided for such vehicles or such gear changes as involve a speeding up of the engine for gear changing.

A further instance for the supervising coordinating effect due to the computer 46 is causing the vehicle to travel at a constant speed if this should be desired, even when running up- or downhill. When running on a hill it will then be necessary, unlike the case of traveling on the level, to change not only the fuel supply but also to change gear. On the basis of the power characteristic and instantaneous condition of running of the IC engine the computer will then recognize when a change of gear is needed and the accordingly passes a respective signal 51 to effect the change in gear. In other words, the supervising computer 46 may be programmed to perform the function of an automatic vehicle speed controller.

Figure 3:
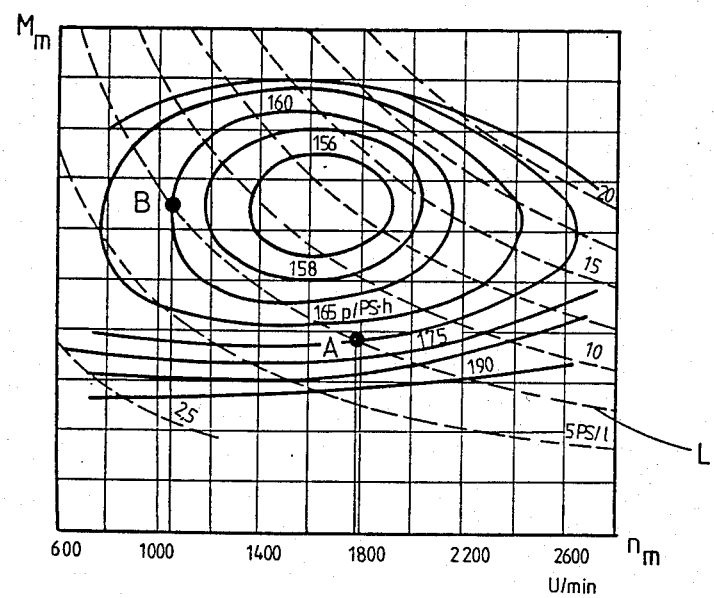
FIG. 3 shows a graph of engine characteristics.

When optimizing the control of the engine and of the transmission in accordance with the efficiencies thereof the supervising computer will ascertain the intersection A in the graph for fuel consumption in FIG. 3 on the basis of a given gear x, the instantaneous engine power L and speed $n_m$. Before the supervising computer 46 causes a gear change x+1, it will firstly ascertain the fuel consumption or the operating point B which following a gear change and the resulting change in engine speed will be in the drive line L. Should this point be outside permitted operation or on a graph line representing greater fuel usage, the gear change will not take place.

If as in FIG. 3, the point B is within permitted operation and on a line representing lower fuel consumption, the supervising computer will then derive the intantaneous acceleration and if it is very small the gear will be changed.

In the case of high acceleration the gear will not be changed, even despite a better fuel consumption, if it seems likely that the gear will have to be changed back again in short period of time.

This not only optimizes the fuel consumption but also avoids unnecessary gear changing (which often takes place when traveling on a hill).

We claim:

1. In a motor vehicle having:
    a power train including an internal combustion engine, a transmission, and a brake system, and
    control elements including an accelerator pedal, a gear shift lever, and a brake pedal,
    a control system comprising:

electronic engine control means operatively located between the accelerator pedal and the engine for regulating the supply of fuel to the engine, electronic transmission control means operatively located between the gear shift lever and the transmission for regulating the gear ratio of the transmission, the electronic transmission control means and the electronic engine control means being operable independently of each other, a supervising computer for producing output signals to control the operation of each of the electronic engine control means and the electronic transmission control means, and means for inputting into the supervising computer signals representative of:

the position of the accelerator pedal,
the position of the brake pedal,
the setting of the gear shift lever,
the quantity of fuel being injecting into the engine,
the engine speed, and
the transmission output speed
the value of the output signals from the supervising computer being responsive to the processing by the computer of said input signals.

2. The arrangement of claim 1 wherein the supervising computer has a memory within which is stored characteristic curves of the internal combustion engine, the transmission, and the braking system.

3. The arrangement of claim 2 including means for inputting into the supervising computer signals representative of the engine temperature and oil pressure.

4. The arrangement of claim 3 including means for inputting into the supervising computer signals representative of the acceleration of the vehicle, the composition of the engine exhaust gas, and the weight of the vehicle.

5. The arrangement of claim 1 wherein the supervising computer comprises a signal processor, at least one input/output unit, a memory, and a microprocessor.

6. The arrangement of claim 5 wherein the output of the signal processor is applied to the input/output unit and also to one of the electronic control means.

7. The arrangement of claim 1 wherein the supervising computer includes means for storing the signals input into it for a predetermined period of time, and means for processing the stored signals to determine the current mode of operation of the vehicle.

8. The arrangement of claim 7 including means for applying to the electronic engine control means and the electronic transmission control means output signals from the supervising computer derived from the stored signals, the output signals serving to establish set points within the electric control means.

9. The arrangement of claim 1 including means for transmitting feed back signals from the engine to the electronic engine control means, means for transmitting feed back signals from the transmission to the electronic transmission control means, and means for transmitting said engine and transmission feed back signals to the supervising computer from the electronic engine control means and the electronic transmission control means, respectively.

* * * * *